United States Patent [19] [11] 4,098,596
Wu [45] Jul. 4, 1978

[54] METHOD FOR PREPARING OPTICAL ARTICLES FROM HYDRATED GLASSES
[75] Inventor: Che-Kuang Wu, Corning, N.Y.
[73] Assignee: Corning Glass Works, Corning, N.Y.
[21] Appl. No.: 805,927
[22] Filed: Jun. 13, 1977

Related U.S. Application Data
[62] Division of Ser. No. 640,733, Dec. 15, 1975, Pat. No. 4,073,654.
[51] Int. Cl.² .................. C03C 17/00; C03C 3/10
[52] U.S. Cl. .................. 65/30 R; 65/18; 65/63; 65/64; 65/136; 106/52; 106/53; 106/472
[58] Field of Search .................. 106/52, 53, 47 R; 65/30 R, 18, 63, 64, 136

[56] References Cited
U.S. PATENT DOCUMENTS

| | | | |
|---|---|---|---|
| 3,498,802 | 3/1970 | Bickford et al. | 106/52 |
| 3,498,803 | 3/1970 | Stookey | 106/52 |
| 3,811,853 | 5/1974 | Bartholomew et al. | 106/52 |
| 3,837,825 | 9/1974 | Loxley | 65/18 |
| 3,912,481 | 10/1975 | Bartholomew et al. | 65/30 R |
| 3,915,720 | 10/1975 | Tarcza | 65/30 R X |
| 3,940,277 | 2/1976 | Pierson et al. | 106/39.7 |
| 3,948,629 | 4/1976 | Bartholomew et al. | 65/30 R |

Primary Examiner—Robert L. Lindsay, Jr.
Attorney, Agent, or Firm—James A. Giblin; Clinton S. Janes, Jr.; Clarence R. Patty, Jr.

[57] ABSTRACT

A glass article having an optical quality surface smoothness can be formed by molding a "silanol" glass material against a die having a molding surface which is a mirror of that required for the glass article, thereby obviating glass grinding and polishing steps. The article is prepared by first forming an anhydrous base glass comprising, in mole percent on the oxide basis, about 72 to 82% $SiO_2$, 10 to 17% $Na_2O$ and/or $K_2O$, and 5 to 15% of an oxide or oxides selected from ZnO and PbO. The base glass may include up to 5% $Al_2O_3$ and up to 3% of $B_2O_3$, BaO and/or MgO. The anhydrous base glass is then hydrated to include a water content ranging from 0.5 to 10% by weight to form a "silanol" glass. That glass is then molded against the die surface at a temperature ranging from about 250° C. to 500° C. and a pressure ranging from about 4,000 to 20,000 psi for a period of time sufficient to replicate the surface smoothness of the die on the glass and, depending on the molding process, yield a glass article containing about 0.5 to 10% by weight of "tightly" bound total water.

9 Claims, 5 Drawing Figures

METHOD FOR PREPARING OPTICAL ARTICLES FROM HYDRATED GLASSES

This is a division, of application Ser. No. 640,733, filed Dec. 15, 1975 now U.S. Pat No. 4,073,654 granted Feb. 14, 1978.

RELATED APPLICATION

U.S. Ser. No. 640,735, filed of even date in the name of R. F. Bartholomew, entitled "Optical Articles From Acid Hydrated Glasses" and assigned to the present assignee.

BACKGROUND OF THE INVENTION

1. Field

This invention is in the general field of hydrated glasses. Specifically, the invention is concerned with optical glass articles which can be prepared from such glasses.

2. Prior Art

Glass articles useful for fine optical applications commonly require a high degree of surface smoothness so that the transmission or reflection of light will not be adversely affected by surface roughness. Typically, to assure surface smoothness of precision optical quality, the surface roughness of the glass should not exceed one-tenth of the wavelength of light being transmitted. Since the wavelengths of visible light range from about 16 microinches (16$\mu$ inches) to 30 microinches (30$\mu$ inches), this means that the surface roughness should not exceed about 1.6 microinches in the case of violet light and 3.0$\mu$ inches in the case of red light.

The relative surface smoothness (or low degrees of surface roughness) of an article can be precisely measured by known means. For example, in one method, the surface characteristics of an article are measured with an instrument which amplifies and displays the displacement of a stylus-like arm which is slowly drawn across the surface of the article. The results can be viewed on a chart as an actual reproduction of the surface being examined, amplified as high as 100,000 times. Alternatively, the results can be described in terms of "Roughness Height". This expression, for purposes of defining a standard, is described as the arithmetical average (AA) deviation expressed in microinches ($\mu$ inches) measured normal to the centerline. Arithmetic Average (AA) is also known in British Standards as Center Line Average (CLA). This terminology is explained more fully in the publication, Surface Texture, ASA B 46.1-1962, published by the American Society of Mechanical Engineers, New York, New York. Typical of the instruments which can measure fine degrees of surface smoothness (peaks and valleys) are instruments known commerically as a Proficorder or a Surfanalyzer®. Detailed descriptions concerning the use of such instruments can be found in manuals used with the instruments and other publications. According to one such manual which accompanies the Gould Surfanalyzer®, Model 1200, the results of surface measurement, expressed in AA, can be converted approximately to the root mean square (rms) average by multiplying the AA by 1.11. Hence, surface smoothness, or a low degree of surface roughness, can be expressed in AA units or rms units over a given surface. An example of rms measurements is described in an article entitled "Polishing of Supersmooth Metal Mirrors", Applied Optics, Vol. 14, No. 8, pp. 1808–1812, August, 1975. See also an article entitled "Surface Characterization: A Total Approach", Research/Development, November, 1975.

As used herein, the expression "optical quality surface" or its equivalent, refers to a glass surface having a "Roughness Height" the AA of which is less than 3.0 microinches (3.0$\mu$ inches) over a surface distance of at least 0.1 inch. A preferred optical quality surface has a Roughness Height the AA of which is less than 1.6 microinches (1.6$\mu$ inches) over a surface distance of at least 0.1 inch, so that the entire range (16 to 30$\mu$ inches) of visible light can pass on or through the surface with minimal diffusion or scattering.

A glass article having an optical quality surface is prepared conventionally in three basic steps. Firstly, a glass blank consisting of given glass forming ingredients is formed by conventional means. Secondly, especially in applications where a surface curvature is required (e.g. spherical or aspherical, convex or concave), it is commonly necessary to subject the glass blank to a relatively rough grinding step to develop the approximately desired plane or curvature. Thirdly, there is a fine polishing step which transforms the surface having the approximate plane or curvature to a fine surface of optical quality having a very precisely controlled surface smoothness. It can be appreciated that the grinding and polishing of glass surfaces for optical purposes require a relatively high degree of skill and/or special equipment, especially for the polishing step where a very high degree of surface smoothness is required.

It should be noted that a surface smoothness of optical quality is often required for a variety of glass articles such as optical lenses and mirrors and that such articles, aside from requiring a high degree of surface smoothness, often require surface curvatures that are difficult to obtain (e.g. aspherical, parabolic surfaces). Such requirements contribute significantly to the cost of preparing high quality articles such as lenses or mirrors. Hence, it would be highly desirable if the time, costs, and equipment requirements associated with the preparation of optical quality surfaces of glass articles could be reduced.

Primarily because of their thermal and rheological physical properties, glass materials conventionally used to prepare fine optical articles cannot be molded by known molding techniques to achieve a surface smoothness of optical quality. In recent years, however, it has been found that certain glass compositions can be successfully hydrated to impart to the glass a relatively low viscosity at moderate temperatures. Such glasses have become known as hydrated glasses because they include varying amounts of water within the glass. See, for example, U.S. Pat. No. 3,498,802 and U.S. Pat. No. 3,498,803, which disclose methods of including water within certain types of glass materials to impart to those materials properties not commonly associated with glass per se. More recently, in U.S. Pat. No. 3,912,481 issued on Oct. 14, 1975 in the names of R. F. Bartholomew et al., entitled "Hydrosilicate Thermoplastic Materials", it has been disclosed that glass articles can be thermoplastically formed at relatively low temperatures by forming such glasses in a two-step process to control the water content of certain hydrated glasses. In the first step, excess water is introduced into a base anhydrous glass. Then, the glass is dehydrated to reduce the water content to a defined range.

Although the above cited patent application does disclose how to obtain some degree of thermoplasticity in certain hydrated glass materials, it has now been found that by critically controlling the water content as well as compositions of hydrated glasses and by applying a defined molding technique, it is possible to prepare glass articles having an optical quality surface and that such a surface can be obtained without subjecting the article to costly grinding and polishing steps. The water content may be controlled via a one-step hydration process, a two-step hydration-dehydration process, or a full hydration process followed by a controlled dehydration by heating in a vacuum. Methods of preparing the articles are described in detail below.

SUMMARY OF THE INVENTION

The product of the present invention is a hydrated optical glass article having at least one optical quality surface such that the arithmetic average of the Roughness Height over a distance of at least 0.1 inch does not exceed $3.0\mu$ inches. In a very preferred embodiment, the arithmetic average of Roughness Height over that distance does not exceed $1.6\mu$ inches. The article comprises a hydrated base glass having a total "tightly" bound water content ranging from about 0.5 to 10% by weight with the base anhydrous glass comprising, by mole percent on the oxide basis, about 72 to 82% $SiO_2$, 10 to 17% $Na_2O$ and/or $K_2O$, and 5 to 15% of a member selected from ZnO, PbO, and mixtures thereof. The glass article of this invention is made by first forming an anhydrous base glass having a composition within the ranges described above. The anhydrous base glass is then hydrated or hydrated and then dehydrated by known means to include a total water content ranging from about 0.5 to 10% by weight to form a "silanol" glass. That glass is then molded at a temperature ranging from about 250° to 500° C. and a pressure ranging from about 4,000 to 20,000 psi against at least one die having an optical quality surface, the reverse of which is desired for the article. The die must be capable of being polished to an optical quality surface smoothness and be able to withstand the above described molding conditions. A preferred die is made from tungsten carbide. The molding is for a period of time sufficient to impart the die surface to the glass article and to assure a final water content within the range of about 0.5 to 10% by weight. In a preferred embodiment the article is formed by molding a "silanol" glass in a porous (foamed), particulate form, and the molding process permits a reduction from a starting water content of 2 to 10% by weight to about 0.5 to 10% by weight, the water reduction being due to the loss of steam during the molding process which permits the porous "silanol" glass particles to fuse into a relatively clear, non-porous article. In preferred embodiments, the molding process is for a period ranging from at least a few seconds to about 60 minutes. Up to 5 mole % $Al_2O_3$ and up to 3 mole % $B_2O_3$, BaO, and/or MgO may be added to the base glass. It is thought that the methods disclosed herein may be useful in preparing a variety of articles requiring an optical quality surface (e.g. lenses, mirrors, gratings, etc.).

SPECIFIC EMBODIMENTS

Figure 1:
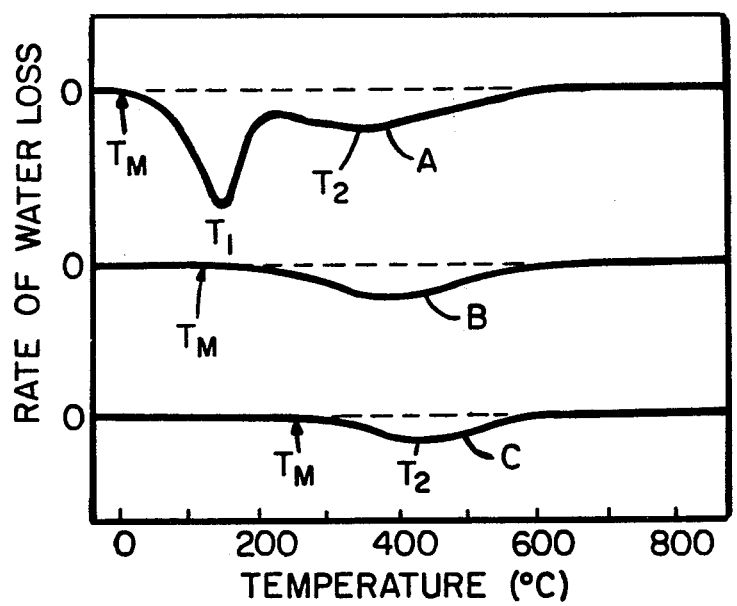
FIG. 1 compares DTG curves for a hydrated glass and "silanol" glasses of the same base glass composition.

The hydrated glass articles of the present invention have two very important properties. These properties are the amounts and types of water contained in the glass vis-a-vis the other glass constituents. To express these properties, the operable hydrated glasses of this disclosure can be deemed "silanol" glasses. "Silanol" glasses may be considered a type of hydrated glass having a water content intermediate that of a totally hydrated glass and a totally anhydrous glass. Anhydrous glass is defined as a glass containing less than 0.1 weight percent water and the total amount of that water is present in the form of silanol groups. This is in contrast with hydrated glasses in which water may be present mostly as molecular water. Since a large fraction of the water content of the hydrated glasses of the present invention exists in the form of silanol groups, the "silanol" glasses of the present invention may be deemed a borderline material between highly hydrated glass and anhydrous glass. The expression "silanol" as used herein, refers to a species of glass having a defined water content and compositional range, both of which are described in greater detail below.

COMPOSITION RANGES

To form an acceptably durable molded article having an optical quality surface, as defined above, the inorganic oxide constituents must fall within specific ranges and the specific compositions within those ranges must be compatible with the total water content needed in successfully molding an article according to this invention. It has been found that the base anhydrous glass should comprise, in mole percent on an oxide basis, about 72 to 82% $SiO_2$, 10 to 17% $Na_2O$ and/or $K_2O$, and 5 to 15% of ZnO, PbO, or mixtures thereof, the total of these constituents comprising at least 90% by weight of the anhydrous glass. The balance may consist of various ingredients conventionally used in glass forming operations to achieve certain forming or final properties in the base glass. Up to 5 mole % $Al_2O_3$ and up to 3 mole % of $B_2O_3$, BaO and/or MgO may be included to make up part of the balance. It should be pointed out that, within the above ranges, ZnO and PbO may be used interchangeably provided appropriate changes are made in the content of the $Na_2O$ and/or $K_2O$ and $Al_2O_3$. Such adjustments are believed to be related to the fact that the equilibrium ratio of network modifiers to network formers is different for ZnO than PbO. Various anhydrous base glasses which are within the above compositional limits were prepared having the specific compositions shown in Table I below.

TABLE I

Anhydrous Glass Compositions (mole %)

| Sample No. | SiO$_2$ | Na$_2$O | K$_2$O | Al$_2$O$_3$ | ZnO | PbO | B$_2$O$_3$ | BaO | MgO | Cs$_2$O |
|---|---|---|---|---|---|---|---|---|---|---|
| 1 | 76.68 | 10.76 | 3.02 | 1.28 | 7.74 | | 0.45 | | | |
| 2 | 76.33 | 10.71 | 3.01 | 1.28 | 7.71 | | 0.90 | | | |
| 3 | 75.65 | 10.61 | 2.98 | 1.27 | 7.64 | | 1.79 | | | |
| 4 | 74.32 | 10.43 | 2.93 | 1.24 | 7.51 | | 3.51 | | | |
| 5 | 77.00 | 10.82 | 3.04 | 1.29 | 7.79 | | | | | |
| 6 | 75.33 | 10.86 | 3.05 | 1.29 | 9.39 | | | | | |
| 7 | 72.76 | 10.95 | 3.07 | 1.30 | 11.83 | | | | | |
| 8 | 70.15 | 11.04 | 3.10 | 1.31 | 14.32 | | | | | |
| 9 | 76.30 | 10.85 | 3.05 | 1.92 | 7.81 | | | | | |
| 10 | 74.84 | 10.95 | 3.07 | 3.19 | 7.88 | | | | | |
| 11 | 74.17 | 10.70 | 3.00 | 1.28 | 7.70 | | | | 3.06 | |
| 12 | 75.59 | 10.75 | 3.02 | 1.28 | 7.74 | | | | 1.54 | |
| 13 | 77.03 | 9.80 | 4.04 | 1.29 | 7.78 | | | | | |
| 14 | 77.01 | 8.78 | 5.09 | 1.29 | 7.78 | | | | | |
| 15 | 77.04 | 7.24 | 6.06 | 1.29 | 7.78 | | | | | |
| 16 | 77.02 | 9.79 | 3.03 | 1.29 | 7.78 | | | | | 1.02 |
| 17 | 77.35 | 4.49 | 6.86 | 2.34 | | 9.11 | | | | |
| 18 | 78.79 | 3.19 | 6.21 | 3.09 | | 8.70 | | | | |
| 19 | 77.12 | 6.51 | 7.02 | 1.30 | 6.01 | 1.00 | | 0.98 | | |
| 20 | 75.39 | 6.51 | 7.02 | 3.01 | 3.90 | 2.01 | | 2.01 | | |
| 21 | 75.42 | 6.53 | 7.01 | 2.98 | 6.01 | 1.01 | | 0.99 | | |

WATER CONTENT AND TYPES OF WATER IN GLASS

It has been found by analyzing the infrared spectra of hydrated glasses in the fundamental (1600 to 3700 cm$^{-1}$) and overtone, combination transitions (4000 to 8000 cm$^{-1}$) that various species of water exist in hydrated glasses. They are free silanol groups, hydrogen bonded silanol groups, monomeric molecular water, and polymeric molecular water. The polymeric molecular water consists primarily of dimer, trimer, tetramer, and trace amounts of pentamer, hexamer, etc. A method of calculating the amounts of the various water species has been developed. The observed infrared absorption bands, in a silanol glass, at wavelengths of 1.38, 1.41, 1.91, 2.22, 2.50$\mu$ are assigned to OH stretching overtone of free silanol groups, OH stretching overtone of monomeric molecular water, stretch-bending combination mode of monomeric and dimeric molecular water, stretching-bending combination of free silanol groups, and stretching-bending combination of hydrogen bonded silanol groups, respectively. The extinction coefficients at the above five corresponding band centers are 0.454 liter cm$^{-1}$ per mole of MOH, 0.58 liter cm$^{-1}$ per mole of H$_2$O, 3.92 liter cm$^{-1}$ per mole of H$_2$O, 1.77 liter cm$^{-1}$ per mole of MOH and 0.89 liter cm$^{-1}$ per mole of hydrogen bonded MOH, respectively, where M represents any network former, it thus represents mostly Si. MOH are called silanol groups although it could include certain amounts of ZnOH, AlOH, BOH, etc. With the vibrational assignments and extinction coefficients listed above, the concentration of various species of water in silanol glasses are calculated with the well established method. See, for example, "Infrared and Raman Spectra", by Gerhard Herzberg, Van Nostrand Reinhold Company, 1945.

The concentrations of each water species in hydrated glasses of two different anhydrous base compositions are shown, for illustrative purposes, below. Glass compositions "A" and "B", prior to hydration to the indicated water contents, consisted, in mole %, of 77% SiO$_2$, 10.8% Na$_2$O, 3.0% K$_2$O, 1.3% Al$_2$O$_3$, and 7.8% ZnO and corresponded to sample No. 5 in Table I. Compositions "C" and "D", consisted on a mole % anhydrous basis of 76.9% SiO$_2$, 16.5% Na$_2$O, 2.1% Al$_2$O$_3$ and 4.5% MgO, and are not compositions within the scope of this invention.

TABLE II

Water Species of Hydrated Glasses (in wt.% H$_2$O*)

| | Sample | | | |
|---|---|---|---|---|
| | A | B | C | D |
| Total Water | 4.0 | 8.0 | 7.36 | 26.2 |
| Silanol groups (MOH groups**) | | | | |
|   hydrogen bonded | 2.05 | 4.10 | 1.1 | 2.27 |
|   non-hydrogen bonded | 0.60 | 0.74 | 0.9 | 1.86 |
| Total molecular water | 1.35 | 3.25 | 5.36 | 22.07 |
| "tightly" bonded monomeric water | 1.35 | 3.25 | <3.44 | <8.78 |
| "loosely" bonded molecular water (which includes monomer, dimer, trimer, etc.) | 0 | 0 | >1.92 | >13.3 |

*In the above table, all values are expressed as wt.% water so that the sum will equal the "Total Water" as defined by LOI (loss on ignition) after 1 hr. at 1000° C.
**It is understood that 2 MOH groups are equivalent to one H$_2$O molecule with the extra oxygen remaining in the glass matrix after ignition. Note: Most of the MOH groups described herein are believed to be of the silanol type although it is appreciated that some of the MOH groups may be attributed to some other network former (e.g. the aluminum, zinc, or boron constituents).

DESCRIPTION AND DEFINITION OF "SILANOL" GLASSES

A very important aspect of the present invention is the discovery that certain glass compositions which are hydrated to a water content ranging from 0.5% to 10% by weight, containing water predominantly in the form of silanol groups and no "loosely" bound water, are moldable under limited conditions into glass articles having optical quality surfaces. It has also been found that when "tightly" bonded molecular water is included in the glass in an amount up to but not exceeding the silanol group concentration (i.e. [SiOH]:[mol. water]>1), then the molding temperature can be reduced. To be deemed a "silanol" glass as defined herein, the total molecular water content should be ≦ the total silanol concentration. It has been found that in certain glass compositions, a limited amount of monomeric molecular water is as stable in glass as the silanol groups. This particular portion of monomeric molecular water is referred to herein as "tightly" bonded molecular water. Such tightly bonded molecular water, hydrogen bonded silanol groups, and non-hydrogen bonded silanol groups are not decomposed from glass at temperatures below about 120° C. The amounts of total water in silanol glasses are restricted by requiring the absence of "loosely" bonded molecular water species. It is thus obvious that samples A and B of Table II can be deemed "silanol" glasses whereas samples C and D are not.

The "silanol" glasses of the present invention can be readily defined with their temperature ranges of water release as measured by differential thermal gravimetric analysis (DTG) techniques. This is illustrated in FIG. 1 which shows DTG curves for the base glass #5 of Table I with various water concentrations. FIG. 1 illustrates the DTG (heating rate = 10° C/min.) of a hydrated base glass having the base composition #5 of Table I at three levels of total water concentration. Curve "A": an anhydrous glass ribbon which was hydrated at 300° C. and saturated steam pressure to include 12.2 weight % $H_2O$; Curve "B": the hydrated glass of curve "A" was dehydrated in a vacuum oven (−29 torr) at 120° C. for 16 hours to a total water content of 5.5 wt.% $H_2O$; and Curve "C": the hydrated glass of Curve "A" was dehydrated in a preheated, vented oven at 300° C. for one hour to reduce the total water to 4.05%. The total water contents are represented by the areas between the respective DTG curves and the dotted lines. The broad bands centered at $T_1$ and $T_2$ represent "loosely" bonded and "tightly" bonded water respectively. The maximum use temperature for the molded articles of the respective glasses is defined by $T_m$ of FIG. 1.

As can be seen from FIG. 1, the fully hydrated glass (12.2% $H_2O$) of curve A shows two temperature regions of water release when heated gradually from room temperature under a flowing nitrogen atmosphere. $T_1$ and $T_2$ correspond to the two peaks of the DTG curve and are temperatures at which the rate of water loss goes through a maxima. For the particular hydrated glass of curve A, the $T_1$ band is centered at about 175° C. and the $T_2$ band is located between about 300° C. and 450° C. Both $T_1$ and $T_2$ bands are usually broad with half widths about 100° and 200° C., respectively. Additional features, e.g. weak shoulder peaks, may also be observed in certain water levels. When a fully hydrated glass of the composition range of this invention is placed into a preheated oven at temperature T where $T_1 < T < T_2$, prompt dehydration occurs. It has been found that the water (mostly polymeric molecular water) of the $T_1$ band is released completely before the water of the second band at $T_2$ is released. As a result, glasses with no $T_1$ band yet containing any fraction of the $T_2$ band can be produced and molded in accordance with the present disclosure. Returning to FIG. 1, it is clear that curve A represents a hydrated glass since it contains loosely bonded molecular water which leaves the glass in the temperature range of the $T_1$ band. Curves B and C, however, represent the DTG curves of the "silanol" glasses of this invention.

Figure 2:
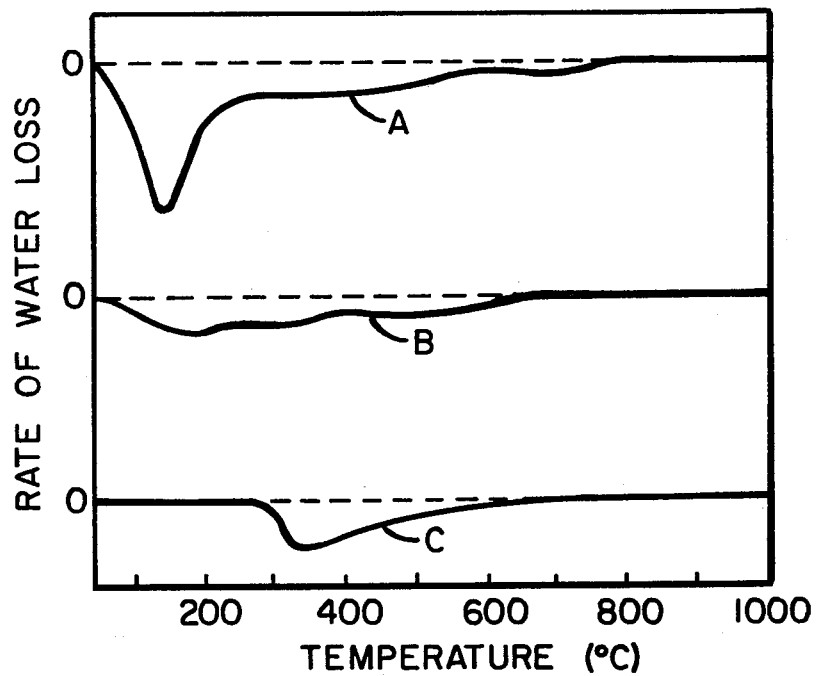
FIG. 2 compares DTG curves for hydrated-dehydrated glasses of two different base glass compositions.

Although the phenomenon described above with reference to FIG. 1 is typical of the glass compositions of the present invention, it is not at all common in the composition ranges (base glass) outside of this invention. Some glass compositions when hydrated and dehydrated do not result in "silanol" glasses because both $T_1$ and $T_2$ bands are diminished proportionately as dehydration occurs. This is clearly illustrated in FIG. 2. In FIG. 2, the DTG curves of hydrated-dehydrated glasses of two base glass compositions are compared. It is clear from the above discussion that curve C of FIG. 2 represents that from a "silanol" glass while curves A and B of FIG. 2 do not. In FIG. 2, the base (anhydrous) glass of curve A had a composition outside of that required for a "silanol" glass of this invention. The base composition consisted, in mole %, of 76.9% $SiO_2$, 16.5% $Na_2O$, 2.1% $Al_2O_3$, and 4.5% MgO; this glass was hydrated to 26 wt. % $H_2O$ and then dehydrated to 16.0% $H_2O$. The glass of curve B was similar to that of A but dehydrated to 7.8% $H_2O$. Curve C represents a glass of the present invention having a base composition identical to sample 5 of Table I and containing 8.3% $H_2O$, all of which was tightly bound — e.g. requiring a temperature above 120° C. to show any release, as indicated by a standard DTG.

It has been found that when the base glasses of the present invention are hydrated and dehydrated to a total water content ranging from 0.5 to 10% by weight, glasses with only a $T_2$ band are obtained, thus indicating that the total water is tightly bound. Further, this tightly bound water has a unique property characteristic of the "silanol" glasses of this disclosure. In such glasses, the ratio of total silanol concentration to total molecular water concentration is greater than unity. In other words, more than half of the total water in the hydrated-dehydrated glasses of the present invention is present in the form of silanol groups. To express this property, the glasses of the present invention are deemed "silanol" glasses and their essential properties can be summarized as follows:

(1) Total water content ranges from about 0.5 to about 10% by weight;

(2) All water of (1) is "tightly" bound; and, upon DTG analysis, would show no water loss below about 120° C.;

(3) The ratio of total silanol groups to total molecular water is greater than unity; and, (4) For durability and molding purposes, prior to being hydrated, the anhydrous base glasses consist, in mole %, of 72 to 82% $SiO_2$, 10 to 17% $Na_2O$ and/or $K_2O$, and 5 to 15% of an oxide or oxides selected from ZnO and PbO.

The compositional limitations of (4) above are essential for both durability and molding of an article having an optical quality surface. It should be pointed out that, as a practical matter, at least 90 mole % of the anhydrous base glass must fall within a defined compositional range and, in very preferred embodiments, at least some $Al_2O_3$ is present up to 5 mole %. Also, up to 3.0 mole percent $B_2O_3$ and/or BaO and/or MgO may be included as well as minor additives conventionally used in glass forming operations (e.g. fining agents, coloring agents, etc.).

The base composition ($SiO_2$, $Na_2O/K_2O$, and ZnO/PbO) should fall within the above compositional range to assume a glass that can be hydrated, to avoid crystal formation, and to assure durability. If any of the above are absent, it is difficult to form a clear, fused, durable article. Also, if more than about 5% $Al_2O_3$ is used, crystallization tends to occur.

Effect of Water on Durability

It has been found that, as a general rule if most of the water is in the form of silanol groups ("tightly" bound), the durability of the silanol glass will be much better than that of the original anhydrous glass, with an equivalent amount of alkali oxide added.

Effect of Water on Viscosity

It has been found that as a general rule if most of the water is in the form of silanol groups, the viscosity at elevated temperatures of the silanol glass will be much lower than that of the original anhydrous glass with equivalent amount of alkali oxide added.

Preparation of "Silanol" Glasses

"Silanol" glasses are obtained most readily through dehydration of hydrated glasses of certain compositions. However, they may also be prepared by other methods as long as the total water content and compositional ranges satisfy the above-described requirements for "silanol" glass. It has been found that the anhydrous base glass compositions for "silanol" glasses hydrate readily in a saturated steam environment at about a temperature of $\frac{1}{2} (T_1 + T_2)$ where $T_1$ and $T_2$ are the temperatures corresponding to the two peaks of a DTG curve. Any means of dehydration may then be applied to the thus hydrated glasses. For example:

(1) Dehydration of such hydrated glasses, in the form of ribbon or granules, can be accomplished in an oven at a temperature up to $T_2$ of the hydrated glass DGT curve for a period up to 16 hours; or (2) Dehydration can be accomplished in a vacuum oven at a temperature up to $\frac{1}{2} (T_1 + T_2)$ for a period up to 24 hours.

Dehydration in a preheated dry oven at 250° and 300° C. usually yields foams while dehydration in vacuum at lower temperatures (i.e., 80° to 200° C.) resulted in a milky white material which was porous. It was found that both the foam and rigid milky white material can be molded into transparent articles which show neither immediate nor delayed cracking. Through the release of about 1-2% water from the hydrated glass during the molding process, it is possible in practice to eliminate air within the pores which, if not removed, would prevent fusion of the porous hydrated glass. Air can also be removed through a vacuum process without water reduction, if desired. The light transmittance of the bulk of such molded articles, containing 0.5 to 10% total water, may approach that of the starting anhydrous glass, e.g. luminous transmittance of 88% for molded disc with 2 mm in thickness. Transmittance is defined in accordance with ASTM recommended practice D 1003 as the ratio of transmitted to incident light. The transmittance includes diffused light. Hence, the actual amount of undeflected light may be somewhat less than 88%. Moreover, the chemical durability of such molded articles is comparable to that of existing (anhydrous) glass articles.

Molding of Optical Quality Surfaces

Figure 3:
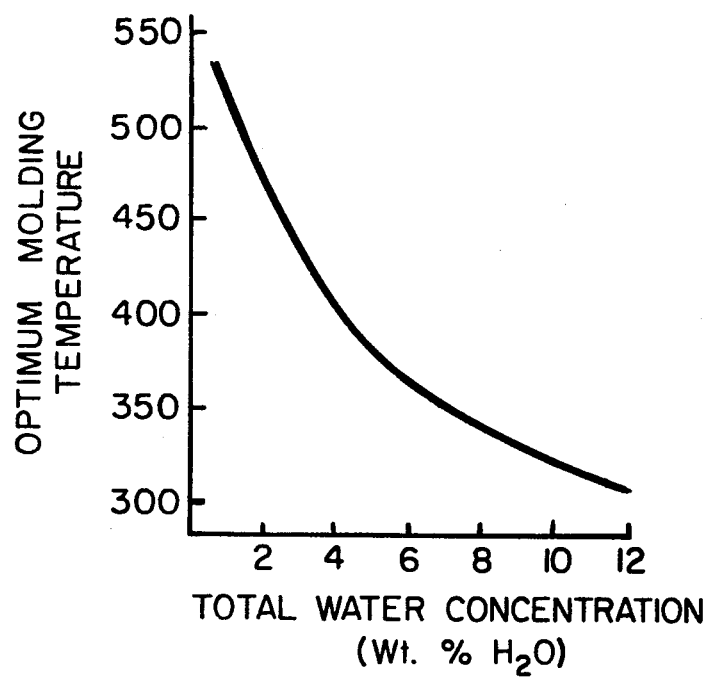
FIG. 3 is a curve illustrating optimum molding temperatures for molding porous silanol granules of certain ZnO containing compositions as a function of total water content of a molded article.

After the anhydrous base glass has been hydrated or hydrated and dehydrated to satisfy the requirements for a "silanol" glass, the "silanol" glass is molded against a die having a desired surface of optical quality. Although it can be appreciated that the optimum molding temperature is a function of the glass composition, it has been found that the optimum molding temperature is much more sensitive to the water concentration than to the base glass composition within the range of present invention. FIG. 3 shows the optimum molding temperatures for molding porous silanol glasses of certain zinc-containing glass compositions into fused articles as a function of total water concentration in the molded article. The FIG. 3 curve is applicable for the following glass compositions (anhydrous oxide bases) having the indicated water contents: 4 to 15 mole percent ZnO; 1.3 percent $Al_2O_3$; 10.8 percent $Na_2O$; 3.0 percent $K_2O$; and the balance $SiO_2$. In FIG. 3 the criterion for determining optimum molding temperature is the maximum transparency of the molded article — i.e., less than 5% backward scattering of visible light from the bulk of the molded article. The data of FIG. 3 were obtained by molding a 1 inch diameter glass disc about 2.5 mm thick from hydrated-dehydrated glass granules. The temperature of the mold was raised to the maximum temperature from room temperature with a heating rate not less than 30° C./minute. The temperature was then held at the optimum temperature for about 0 to 15 minutes, according to the thickness of the glass article to ensure a uniform temperature throughout the glass article. The pressure used for determining the optimum molding temperature was 10,000 psi. It was found that prior to applying the pressure, an evacuation period is preferred.

Molding Process

The total water content of the final molded glass articles may be identical to that of the hydrated-dehydrated silanol glass starting material (e.g. 0.5 to 10 wt.%) as long as there is no leakage of steam from the glass materials (granules) in the molding process. However, it has been found that it is important for practical purposes to get rid of air in the fine pores of hydrated-dehydrated glass granules, if used, prior to the sintering of glass granules. As a result, there are specific requirements for the construction of a mold in the molding of silanol glasses for granules. Namely, being able to draw vacuum at room temperature and forming a tight seal against the leakage of steam at elevated temperature up to temperatures of FIG. 3. Moreover, one can circumvent the requirements for a sophisticated mold design by a mechanism which makes use of an excess amount of water in the molding material. Namely, air in the fine pores of granules is flushed out with controlled amounts of water vapor which is released from the silanol glass. The weight loss due to dehydration of silanol glass in the mold is controlled by heating rate and granule sizes. An optimum amount of weight loss, e.g., 1 to 2 weight percent $H_2O$ for molding 2 mm thick discs, during molding ensures the fusion of granules together. The concentrations of silanol groups and molecular water in the molded article is a function of total water concentration only, for a given base glass composition.

In the examples below, various molding dies were used. The main requirements for the dies are that they have an optical quality surface which is a mirror of that desired for the molded article and that they be made of a material which permits release of the molded article and is compatible with the molding temperature and pressure conditions. Examples of dies which meet these requirements are dies made from tungsten carbide, various alloys of tungsten and glassy carbon.

Various methods of forming glass articles (discs, about 1 inch × $\frac{1}{8}$ inch) having optical quality surfaces are described in detail below.

EXAMPLE I

Figure 4A:
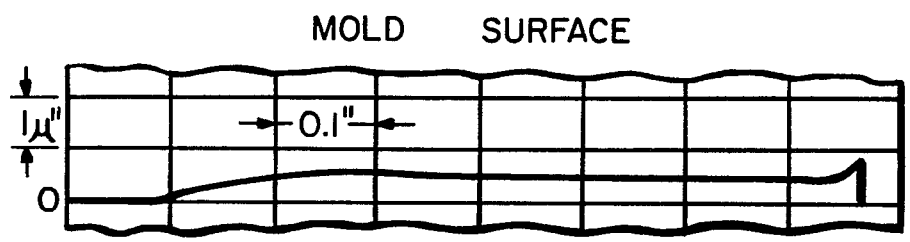
FIGS. 4a and b represent surface smoothness measurements of an article of the present invention and the die used to form the article.
Figure 4B:
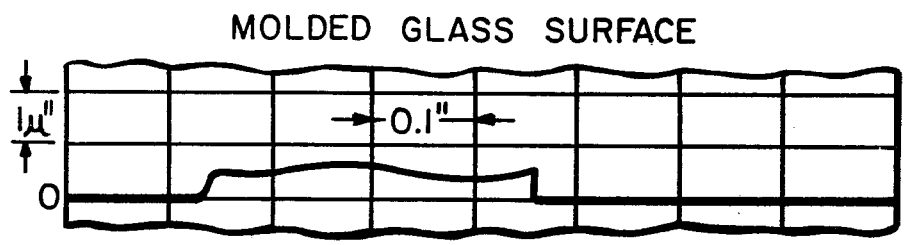

Anhydrous Base Glass Composition (in mole percent):
  10.82% $Na_2O$, 3.04% $K_2O$, 7.79% ZnO, 1.29% $Al_2O_3$, and 77.0% $SiO_2$;
Base Glass Form:
  0.4 mm thick strips (ribbon)
Hydrating Conditions:
  250° to 300° C., saturated steam
Dehydration Conditions:
  Foam in vented oven at 300° C.
Total Water Content:

Fully hydrated: 13.5 to 10.5 weight percent depending on hydration temperature
  After dehydration: 5.0%
  Molded disc: 3.2%
Molding Conditions:
  Maximum temperature = 425° C.
  Pressure = 10,000 psi
Results:
  See FIGS. 4a and 4b which illustrates Surface measurements of the die and molded article, respectively. The results in those figures are expressed in terms of AA. The measurement represented by FIG. 4b shows that the surface was well within the above definition of optical quality surface, e.g., for a distance of about 0.3 inches, the Roughness Height (AA) was less than 1$\mu$ inch. The surfaces illustrated in FIGS. 4a and 4b were measured with a Gould Surfanalyzer ®, Model 1200. The measurements were made with a 200mg probe and a stylus of 0.0005 inch radius and diamond tip. The instrument was calibrated with standards supplied by the manufacturer for a roughness of 125$\mu$ inches.

EXAMPLE II

Anhydrous Base Glass Composition (in mole percent):
  10.85% $Na_2O$, 3.05% $K_2O$, 7.82% ZnO, 1.29% $Al_2O_3$, 2.28% $B_2O_3$, and 74.64% $SiO_2$
Base Glass Form:
  0.4 mm thick (ribbon)
Hydration Conditions:
  300° C., saturated steam
Dehydration Condition:
  Foam in vented oven at 300° C.
Total Water Content: (wt.%)
  Fully hydrated: 10%
  After dehydration: 4.94%
  Molded Disc = 3.0%
Molding Conditions:
  430° C.
  10,000 psi

EXAMPLE III

Anhydrous Base Glass Composition (in mole percent):
  3.19% $Na_2O$, 6.21% $K_2O$, 3.09% $Al_2O_3$, 8.7% PbO, and 78.79% $SiO_2$
Base Glass Form:
  0.4 mm (ribbon)
Hydration Conditions:
  275° C., saturated steam
Dehydration Condition:
  Vacuum oven at 150° C.
Total Water Content: (wt.%)
  Fully hydrated: 6.5%
  After dehydration: 2.7%
  Molded disc: 1.89%
Molding Temperature:
  450° C.

EXAMPLE IV

Anhydrous Base Glass Composition (in mole percent):
  8.78% $Na_2O$, 5.09% $K_2O$, 7.78% ZnO, 1.29% $Al_2O_3$, and 77.01% $SiO_2$
Base Glass Form:
  0.4 mm thick (ribbon)
Hydration Conditions:
  275° C., saturated steam
Dehydration Condition:
  Vacuum oven at 120° C.
Total Water Content: (wt.%)
  Fully hydrated: 12%
  After dehydration: 6%
  Molded Disc: 4%
Molding Temperature:
  375° C.

Other glass compositions were made and then hydrated and/or hydrated-dehydrated to form silanol glasses which were molded. These further examples, along with details of preparing each, are summarized with the above examples in Table III below. The "sample" nos. of the table refer to the anhydrous base compositions of Table I.

TABLE III

Water contents (wt.%) Hydration Conditions, and Molding temperatures for glass discs (about 1 inch × ⅛ inch) made using base glass compositions of Table I.

| Sample No. | Hydration at 100% RH and 300° C (* = 275° C) | Dehydration Allow to Foam at 300° C for 1 hr. | Molding Temp. (° C) |
|---|---|---|---|
| 1 | 10.8 | 4.5 | 430 |
| 2 | 10.3 | 4.1 | 425 |
| 3 | 9.9 | 4.4 | 430 |
| 4 | 9.2 | 4.6 | 430 |
| 5 | 12.5 (13.5*) | 3.6** | 450 |
| 6 | 10.7 (11.7*) | 3.2 | 450 |
| 7 | 9.8 | 2.9 | 475 |
| 8 | 8.8 | 2.8 | 475 |
| 9 | 7.4 | 2.1 | 500 |
| 10 | 11.7 | 2.2 | 500 |
| 11 | 10.8 | | |
| 12 | 17.4* | 2.7 | 475 |
| 13 | 14.7* | 5.0 | 425 |
| 14 | 14.3* | 5.2 | 425 |
| 15 | 14.2* | 4.3 | 430 |
| 16 | 11.9* | 4.0 | 450 |
| 17 | 11.3* | | |
| 18 | 11.5* | 4.3 | 450 |
| 19 | 8.29 | | 275 |
| 20 | 6.12 | | 300 |
| 21 | 4.67 | | 435 |

**Sample was also dehydrated to 5.8% water by placing in vacuum at 120° C - later molded at 375° C.

It can be appreciated that the above-described methods can be modified by one skilled in the art without departing from the spirit and scope of this disclosure. Accordingly, it is intended that the inventions described herein should be limited only by the appended claims.

I claim:

1. A method of forming a glass article comprising the steps of:
  (a) preparing a base anhydrous glass material comprising, in mole percent on an oxide basis, about 72 to 82% $SiO_2$, 10 to 17% $Na_2O$ and/or $K_2O$, and 5 to 15% of a member selected from ZnO, PbO, and mixtures thereof;
  (b) hydrating the glass of step (a) under conditions sufficient to include into the glass a water content ranging from about 0.5 to 10% by weight; and
  (c) molding the hydrated glass of step (b) against at least one die at a temperature ranging from about 250° to 500° C. and at a pressure ranging from about 4,000 to 20,000 psi wherein the smoothness of a molding portion of the die and at least one portion of the glass molded therewith is such that over a distance of at least 0.1 inch, on an arithmetic average basis, the Roughness Height is less than about 3.0 microinches.

2. The method of claim 1 where surface smoothness of a molding portion of the die and at least one portion of the glass molded therewith is such that over a distance of at least 0.1 inch, on an arithmetic average basis, the Roughness Height is less than 1.6 microinches.

3. The method of claim 1 wherein the base glass of step (a) includes up to 5 mole percent $Al_2O_3$.

4. The method of claim 3 wherein the base glass includes between about 1 and 3 mole % $Al_2O_3$.

5. The method of claim 1 wherein the glass of step (a) includes up to 3 mole % of a member selected from $B_2O_3$, BaO, and MgO.

6. The method of claim 1 wherein the hydration of step (b) consists of two steps, an initial hydration step and a partial dehydration step.

7. The method of claim 1 wherein the hydration of step (b) yields a hydrated glass material, the total water content of which consists of silanol groups and molecular water in such a proportion that the ratio of silanol groups to molecular water is equal to or greater than 1.0.

8. The method of claim 1 wherein the molding step of step (c) is done under conditions sufficient to permit the partial release of water from the glass being molded.

9. The method of claim 1 wherein the hydration of step (b) is under conditions sufficient to assure that substantially all water present is in the form of silanol groups and that, upon DTG analysis, no water loss occurs below about 120° C.

* * * * *